(12) United States Patent
Ishida et al.

(10) Patent No.: US 9,945,099 B2
(45) Date of Patent: Apr. 17, 2018

(54) INDUSTRIAL VEHICLE

(71) Applicant: KCM Corporation, Hyogo (JP)

(72) Inventors: Hiroyuki Ishida, Kobe (JP); Keisuke Kobayashi, Kakogawa (JP); Takatomo Ohno, Akashi (JP); Atsushi Kondo, Kakogawa (JP); Tadahiro Miyagawa, Kakogawa (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/528,399

(22) PCT Filed: Nov. 21, 2014

(86) PCT No.: PCT/JP2014/005858
§ 371 (c)(1),
(2) Date: May 19, 2017

(87) PCT Pub. No.: WO2016/079773
PCT Pub. Date: May 26, 2016

(65) Prior Publication Data
US 2017/0321393 A1 Nov. 9, 2017

(51) Int. Cl.
*B60K 13/04* (2006.01)
*E02F 9/08* (2006.01)
(Continued)

(52) U.S. Cl.
CPC ............ *E02F 9/0866* (2013.01); *B60K 13/04* (2013.01); *E02F 9/0883* (2013.01); *F01N 3/08* (2013.01);
(Continued)

(58) Field of Classification Search
CPC ........ B60K 13/04; B60K 13/06; F01N 3/0293
(Continued)

(56) References Cited

U.S. PATENT DOCUMENTS 9,267,267 B1 * 2/2016 Kamimae ............... B60K 13/02
9,636,998 B1 * 5/2017 LeDoux ............... B60K 15/063
(Continued)

FOREIGN PATENT DOCUMENTS

JP 5336647 B1 11/2013
JP 2014-122476 A 7/2014
(Continued)

OTHER PUBLICATIONS

International Search Report (PCT/ISA/210) issued in PCT Application No. PCT/JP2014/005858 dated Feb. 3, 2015 with English translation (five pages).
(Continued)

*Primary Examiner* — Jeffrey J Restifo
(74) *Attorney, Agent, or Firm* — Crowell & Moring LLP (57) ABSTRACT

An industrial vehicle includes: an exhaust gas treatment device arranged in an engine room so as to be located above an engine, the exhaust gas treatment device including a pretreatment unit accommodating a diesel oxidation catalyst and extending in the forward/rearward direction, a selective catalytic reduction unit located adjacent to the pretreatment unit and extending in the forward/rearward direction, a connecting pipe including a mix portion, a first bent portion, and a second bent portion, the mix portion being located between the pretreatment unit and the selective catalytic reduction unit and extending in the forward/rearward direction, the first bent portion connecting the mix portion and an outlet of the pretreatment unit, the outlet being located close to a dividing wall, the second bent portion connecting the mix portion and an inlet of the selective catalytic reduction unit, the inlet being located far from the dividing wall, and a urea water injection device attached to the first bent portion of the connecting pipe so as to be located on an extended line of the mix portion and configured to inject urea water into
(Continued)

an exhaust gas; a urea water tank arranged outside the engine room and storing the urea water; and a urea water pipe configured to guide the urea water from the urea water tank to the urea water injection device and penetrating the dividing wall.

4 Claims, 5 Drawing Sheets

(51) Int. Cl.
    *F01N 3/08*         (2006.01)
    *F01N 3/10*         (2006.01)
    *F01N 3/20*         (2006.01)
    *F01N 3/28*         (2006.01)
    *E02F 3/34*         (2006.01)

(52) U.S. Cl.
    CPC ........... *F01N 3/106* (2013.01); *F01N 3/2066* (2013.01); *F01N 3/2896* (2013.01); *E02F 3/34* (2013.01); *F01N 2610/02* (2013.01)

(58) Field of Classification Search
    USPC ............................................ 180/309; 60/299
    See application file for complete search history.

(56) References Cited

U.S. PATENT DOCUMENTS

| | | | | |
|---|---|---|---|---|
| 9,777,616 B1* | 10/2017 | Kanayama | ............. | B60K 11/06 |
| 2010/0178216 A1* | 7/2010 | Honda | ................... | F01N 3/035 |
| | | | | 422/171 |
| 2014/0124284 A1* | 5/2014 | Sekiya | ................... | B60K 13/04 |
| | | | | 180/309 |
| 2014/0182963 A1* | 7/2014 | Sekiya | ................... | B60K 13/04 |
| | | | | 180/309 |
| 2014/0196974 A1* | 7/2014 | Hayashi | ................. | B60K 13/04 |
| | | | | 180/309 |
| 2014/0196975 A1* | 7/2014 | Hata | ..................... | E02F 9/0866 |
| | | | | 180/309 |
| 2014/0305110 A1* | 10/2014 | Himoto | ................. | E02F 9/0833 |
| | | | | 60/324 |
| 2014/0318882 A1* | 10/2014 | Sawada | ................. | B60K 13/04 |
| | | | | 180/309 |
| 2014/0326527 A1* | 11/2014 | Harada | ................. | E02F 9/0866 |
| | | | | 180/309 |
| 2015/0000258 A1* | 1/2015 | Kondo | ................. | F01N 13/002 |
| | | | | 60/301 |
| 2015/0075893 A1* | 3/2015 | Sakai | ................. | F01N 13/1805 |
| | | | | 180/309 |
| 2015/0176451 A1* | 6/2015 | Tsutsumi | ............... | B01D 53/86 |
| | | | | 60/298 |
| 2015/0204050 A1* | 7/2015 | Kanamori | ................. | B60R 3/00 |
| | | | | 180/309 |
| 2015/0211209 A1* | 7/2015 | Okuda | ................... | B60K 13/04 |
| | | | | 180/309 |
| 2015/0275477 A1* | 10/2015 | Shintani | ................. | B60K 13/04 |
| | | | | 280/834 |
| 2015/0299983 A1* | 10/2015 | Okamoto | .............. | E02F 9/0883 |
| | | | | 180/296 |
| 2015/0306950 A1* | 10/2015 | Sandou | ................. | E02F 9/0866 |
| | | | | 60/297 |
| 2015/0308077 A1* | 10/2015 | Arai | ..................... | B60K 15/063 |
| | | | | 180/309 |
| 2016/0053463 A1* | 2/2016 | Kamimae | ............. | E02F 9/0866 |
| | | | | 180/309 |
| 2016/0068058 A1* | 3/2016 | Kamimae | ............. | B60K 11/08 |
| | | | | 180/309 |
| 2016/0069043 A1* | 3/2016 | Kamimae | ............. | B60K 13/02 |
| | | | | 180/309 |
| 2016/0115840 A1* | 4/2016 | Azuma | ................. | F01N 13/009 |
| | | | | 180/309 |
| 2016/0137054 A1* | 5/2016 | Ueta | ....................... | B60K 13/04 |
| | | | | 180/309 |
| 2016/0152131 A1* | 6/2016 | Fujii | ..................... | E02F 9/0883 |
| | | | | 180/309 |
| 2016/0153173 A1* | 6/2016 | Yabe | ................. | B60K 11/04 |
| | | | | 180/68.2 |
| 2016/0160726 A1* | 6/2016 | Imano | .................... | B60K 11/06 |
| | | | | 60/276 |
| 2016/0230633 A1* | 8/2016 | Mano | .................... | E02F 9/0883 |
| 2016/0237646 A1* | 8/2016 | Yabe | .................... | B60K 11/04 |
| 2016/0265194 A1* | 9/2016 | Ohmura | ................. | B60K 13/04 |
| 2016/0281327 A1* | 9/2016 | Hashimoto | ............... | E02F 9/18 |
| 2016/0281575 A1* | 9/2016 | Suemitsu | .............. | F01N 13/002 |
| 2016/0311314 A1* | 10/2016 | Kurokawa | ........... | E02F 9/0866 |
| 2017/0009628 A1* | 1/2017 | Kimura | ................. | F01N 3/2066 |
| 2017/0051472 A1* | 2/2017 | Mochimaru | ............... | E02F 9/18 |
| 2017/0096795 A1* | 4/2017 | Takami | ................. | E02F 9/0866 |
| 2017/0204770 A1* | 7/2017 | Kimura | ................. | F01N 3/2839 |
| 2017/0211255 A1* | 7/2017 | Ozaki | ......................... | E02F 3/32 |
| 2017/0234193 A1* | 8/2017 | Hertsgaard | ........... | F01N 3/2896 |
| | | | | 60/301 |
| 2017/0268200 A1* | 9/2017 | Todokoro | ................. | B60K 11/02 |
| 2017/0284059 A1* | 10/2017 | Takeyama | ............. | B60K 13/02 |
| 2017/0284060 A1* | 10/2017 | Yamazaki | ............. | E02F 9/0866 |
| 2017/0284255 A1* | 10/2017 | Takeyama | ............. | E02F 9/0866 |
| 2017/0314449 A1* | 11/2017 | Ueta | ..................... | F01N 3/2066 |
| 2017/0321393 A1* | 11/2017 | Ishida | ................. | B60K 13/04 |

FOREIGN PATENT DOCUMENTS

| | | |
|---|---|---|
| WO | WO 2009/041103 A1 | 4/2009 |
| WO | WO 20141065023 A1 | 5/2014 |

OTHER PUBLICATIONS

Japanese-language Written Opinion (PCT/ISA/237) issued in PCT Application No. PCT/JP2014/005858 dated Feb. 3, 2015 (four pages).

* cited by examiner

INDUSTRIAL VEHICLE

TECHNICAL FIELD

The present invention relates to an industrial vehicle, such as a wheel loader, a hydraulic excavator, or a bulldozer.

BACKGROUND ART

In some of industrial vehicles, for example, a machine room is arranged behind a driver's cab and includes an engine room and a ventilation room which are separated by a dividing wall in a forward/rearward direction (a front direction of the driver's cab and its opposite direction). An engine is arranged in the engine room, and a radiator for the engine is arranged in the ventilation room.

Figure 5A:
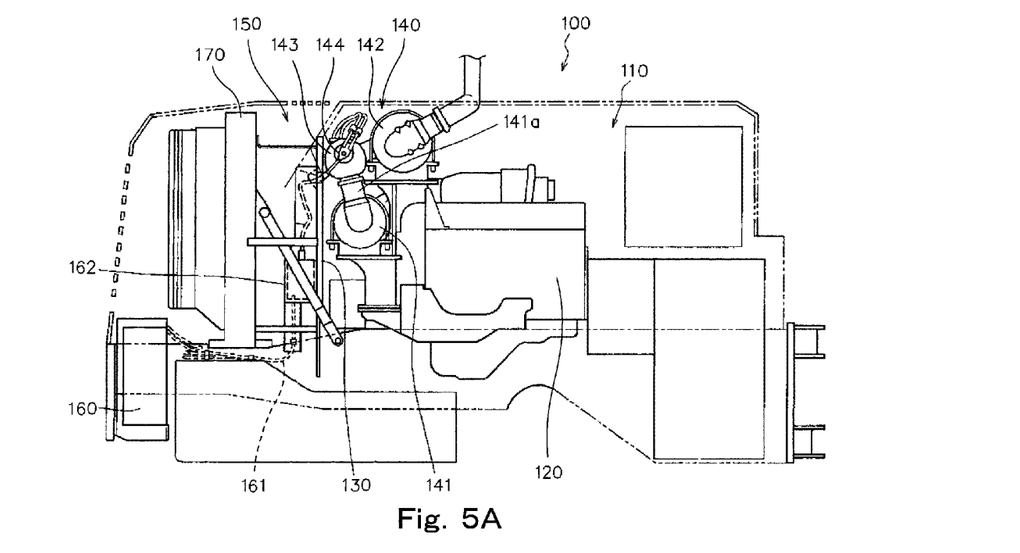
FIGS. 5A and 5B are a side view and a plan view, respectively, and show an internal structure of a rear portion of a conventional industrial vehicle.
Figure 5B:
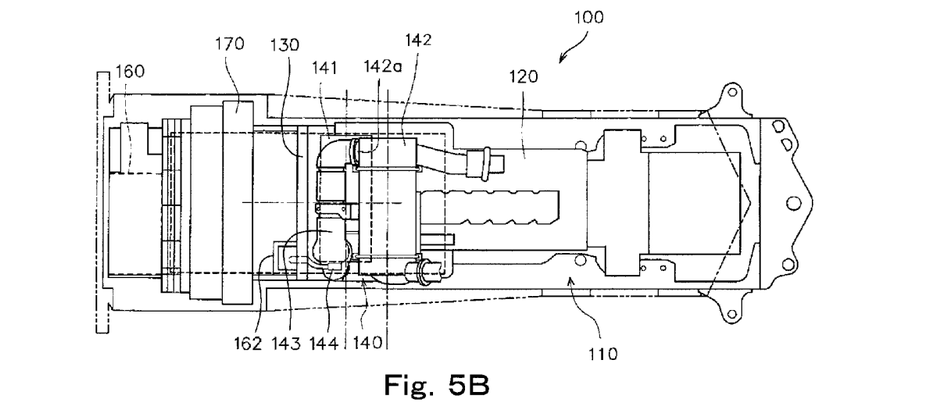

In recent years, it has been proposed that to reduce $NO_x$ in an exhaust gas, such industrial vehicle includes an exhaust gas treatment device that executes a selective catalytic reduction (SCR) using urea water as a reducing agent. For example, as shown in FIGS. 5A and 5B, PTL 1 discloses an industrial vehicle 100 in which an exhaust gas treatment device 140 is arranged in an engine room 110 together with an engine 120.

Specifically, according to the industrial vehicle 100 disclosed in PTL 1, the exhaust gas treatment device 140 includes: a pretreatment unit 141 having a diesel particulate filter (DPF); and an SCR unit 142 that causes the urea water to react with the exhaust gas.

The pretreatment unit 141 is cylindrical, is arranged between the engine 120 and a dividing wall 130, and extends in a vehicle width direction. The SCR unit 142 is also cylindrical, is arranged above the pretreatment unit 141 and the engine 120, and extends in the vehicle width direction.

The pretreatment unit 141 includes an outlet 141a at a right side in the vehicle width direction, and the SCR unit 142 includes an inlet 142a at a left side in the vehicle width direction. The outlet 141a and the inlet 142a are connected to each other by a connecting pipe 143 extending in the vehicle width direction. Further, a urea water injection device 144 is attached to an end portion of the connecting pipe 143, the end portion being located at the right side in the vehicle width direction. The urea water injection device 144 injects the urea water into the exhaust gas in a direction along a center line of a linear portion of the connecting pipe 143, the linear portion extending in the vehicle width direction.

A radiator 170 for the engine is arranged in a ventilation room 150 that is separated from the engine room 110 by the dividing wall 130. Further, a urea water tank 160 storing the urea water is arranged under the ventilation room 150. Then, the urea water is guided from the urea water tank 160 to the urea water injection device 144 through a urea water pipe 161 penetrating the dividing wall 130. A urea water pump 162 is provided on a portion of the urea water pipe 161.

CITATION LIST

Patent Literature

PTL 1: Japanese Patent No. 5336647

SUMMARY OF INVENTION

Technical Problem

According to the configuration of the exhaust gas treatment device 140 shown in FIGS. 5A and 5B, since the pretreatment unit 141 is arranged between the engine 120 and the dividing wall 130, the engine room 110 is long in the forward/rearward direction. To reduce the length of the engine room 110 in the forward/rearward direction, one example is that the SCR unit 142, the connecting pipe 143, and the pretreatment unit 141 are lined up in this order from a front side to a rear side and are arranged above the engine 120. However, in this case, the urea water injection device 144 is located far from the dividing wall 130, and the length of an engine room passing portion of the urea water pipe 161 increases, the engine room passing portion being exposed to a high-temperature environment in the engine room. As a result, a heat influence on the urea water becomes significant.

An object of the present invention is to provide an industrial vehicle capable of reducing the length of the engine room in the forward/rearward direction and also reducing the heat influence on the urea water.

Solution to Problem

To solve the above problem, an industrial vehicle of the present invention includes: a machine room including an engine room and a ventilation room which are separated by a dividing wall in a forward/rearward direction; an engine arranged in the engine room; an exhaust gas treatment device arranged in the engine room so as to be located above the engine, the exhaust gas treatment device including a pretreatment unit accommodating a diesel oxidation catalyst (DOC) and extending in the forward/rearward direction, an SCR unit located adjacent to the pretreatment unit and extending in the forward/rearward direction, a connecting pipe including a mix portion, a first bent portion, and a second bent portion, the mix portion being located between the pretreatment unit and the SCR unit and extending in the forward/rearward direction, the first bent portion connecting the mix portion and an outlet of the pretreatment unit, the outlet being located close to the dividing wall, the second bent portion connecting the mix portion and an inlet of the SCR unit, the inlet being located far from the dividing wall, and a urea water injection device attached to the first bent portion of the connecting pipe so as to be located on an extended line of the mix portion and configured to inject urea water into an exhaust gas; a urea water tank arranged outside the engine room and storing the urea water; and a urea water pipe configured to guide the urea water from the urea water tank to the urea water injection device and penetrating the dividing wall.

According to the above configuration, since the exhaust gas treatment device is arranged above the engine, the length of the engine room in the forward/rearward direction can be reduced. Further, since the mix portion of the connecting pipe extends in the forward/rearward direction, and the urea water injection device is attached to the first bent portion located close to the dividing wall, the urea water injection device can be arranged close to the dividing wall. With this, the length of the engine room passing portion of the urea water pipe can be reduced, the engine room passing portion being exposed to a high-temperature environment in the engine room, and the heat influence on the urea water can be reduced.

A position where the urea water pipe penetrates the dividing wall may be located lower than the urea water injection device, and the urea water pipe may be inclined obliquely downward from the urea water injection device toward the dividing wall. According to this configuration, when the supply of the urea water to the urea water injection device is stopped, the urea water is easily discharged by its own weight from the engine room passing portion to an upstream side in the ventilation room. On this account, it never occurs that the urea water remains in the engine room passing portion during the supply stop of the urea water to be influenced by heat. Thus, it never occurs that when the supply of the urea water is restarted, the urea water newly sent to the engine room passing portion is mixed with the urea water influenced by the heat.

The position where the urea water pipe penetrates the dividing wall may be located lower than a lower end of the connecting pipe. According to this configuration, an angle of the obliquely downward inclination of the engine room passing portion of the urea water pipe can be increased. With this, when the supply of the urea water to the urea water injection device is stopped, the urea water can be quickly discharged from the engine room passing portion.

The dividing wall may include an upper portion facing the pretreatment unit and the SCR unit, the upper portion being inclined so as to get close to the pretreatment unit and the SCR unit as the upper portion extends downward, and the urea water pipe may penetrate the upper portion of the dividing wall. According to this configuration, the length of the engine room passing portion having the obliquely downward inclination can be further reduced as compared to a case where the upper portion is provided parallel to the vertical direction.

Advantageous Effects of Invention

According to the present invention, the length of the engine room in the forward/rearward direction can be reduced, and the heat influence on the urea water can be reduced.

DESCRIPTION OF EMBODIMENTS

Figure 1:
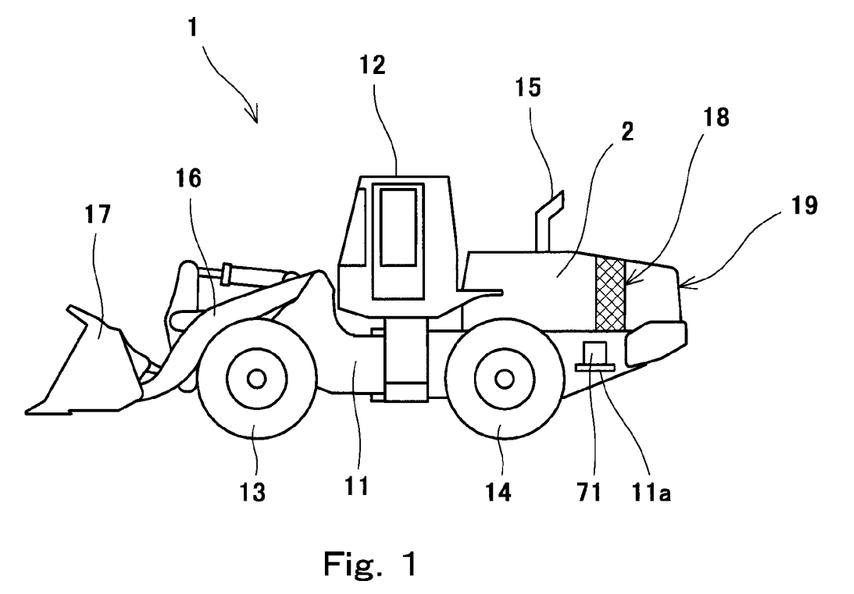
FIG. 1 is a side view showing an industrial vehicle according to one embodiment of the present invention.

FIG. 1 shows an industrial vehicle 1 according to one embodiment of the present invention. The industrial vehicle 1 of the present embodiment is a wheel loader. However, the industrial vehicle of the present invention is not limited to the wheel loader and may be the other industrial vehicle, such as a hydraulic excavator or a bulldozer.

Specifically, the industrial vehicle 1 includes: a vehicle body 11 including front wheels 13 and rear wheels 14; a driver's cab 12 provided on the vehicle body 11 so as to be located at a substantially middle portion of the vehicle body 11; and a machine room 2 provided on the vehicle body 11 so as to be located behind the driver's cab 12. A bucket 17 is attached to a front portion of the vehicle body 11 through a boom 16. The boom 16 and the bucket 17 are operated by respective hydraulic cylinders. Operating oil is supplied to the hydraulic cylinders from a hydraulic pump driven by a below-described engine 3.

Figure 2:
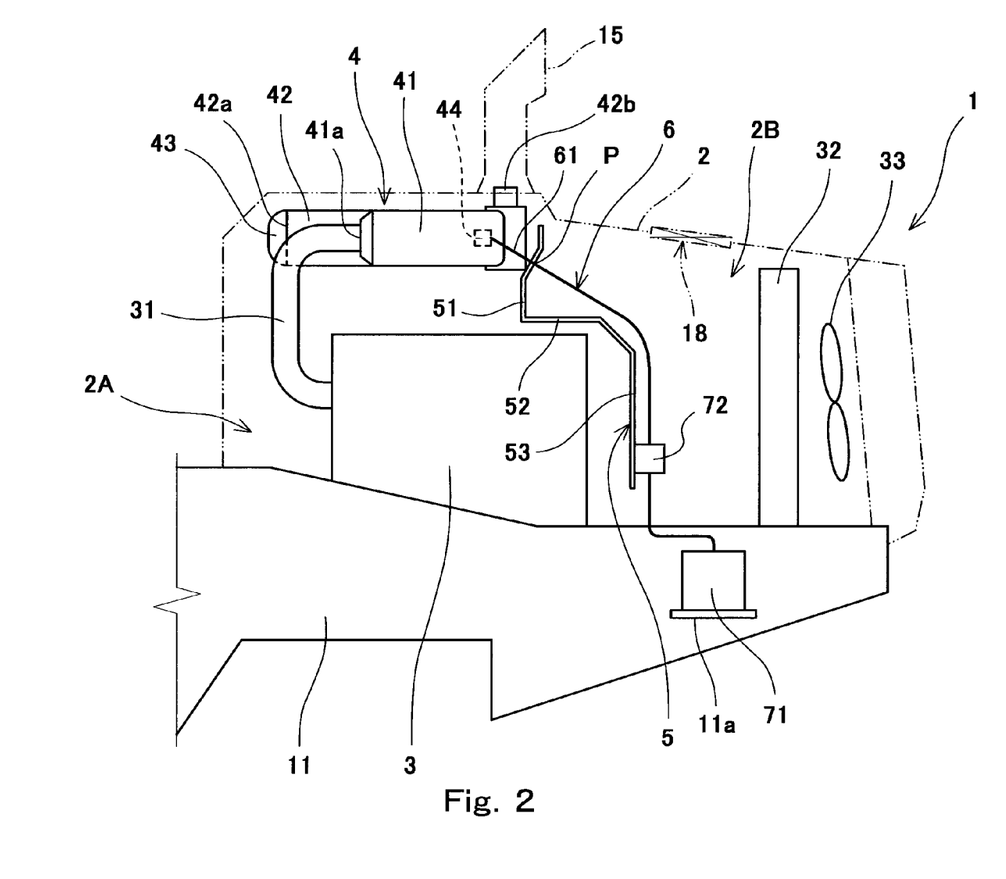
FIG. 2 is a side view showing an internal structure of a rear portion of the industrial vehicle of FIG. 1.
Figure 3:
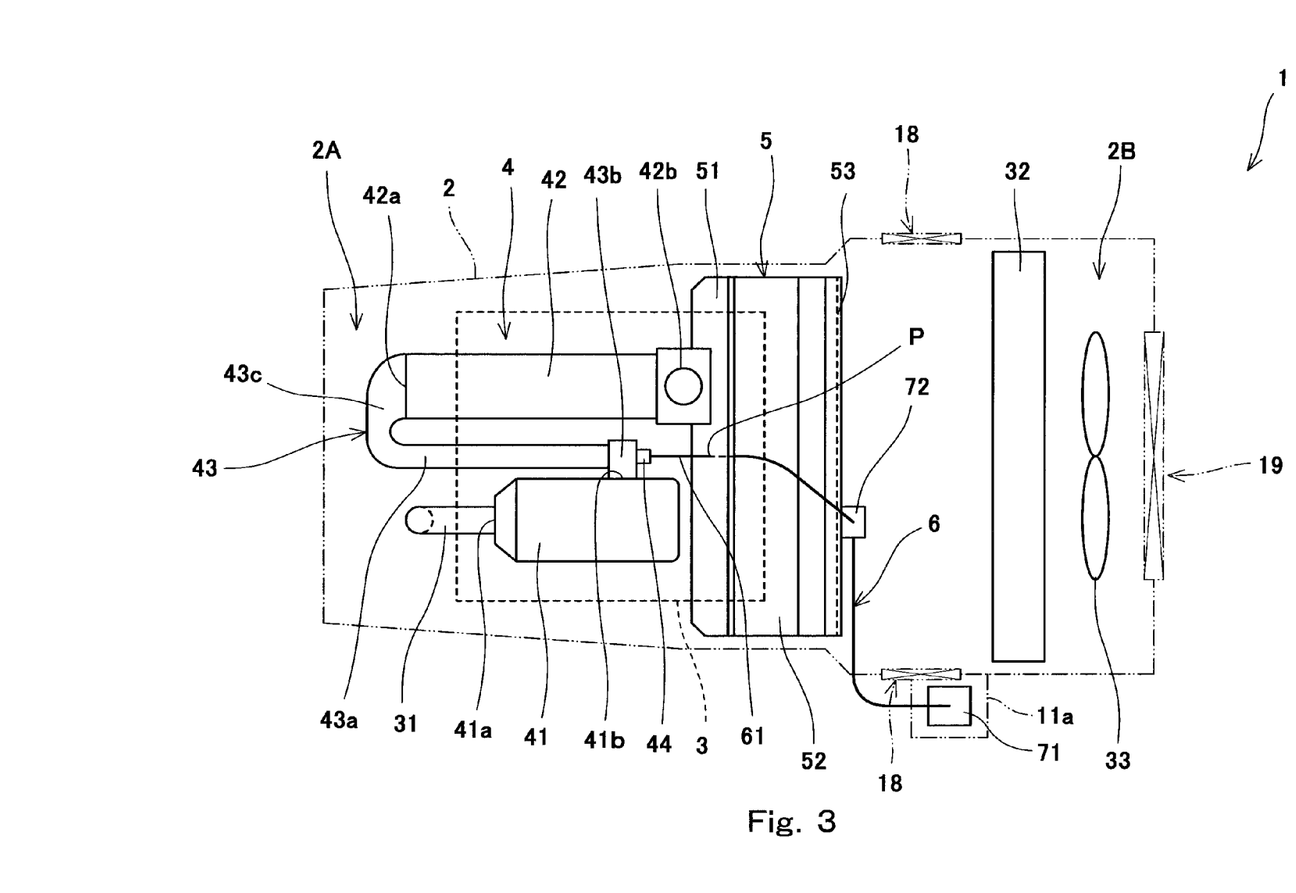
FIG. 3 is a plan view showing the internal structure of the rear portion of the industrial vehicle of FIG. 1.

The machine room 2 is a room sandwiched between the rear wheels 14 and having a relatively narrow width. More specifically, as shown in FIGS. 2 and 3, the machine room 2 includes an engine room 2A at a front side and a ventilation room 2B at a rear side. The engine room 2A and the ventilation room 2B are separated by a dividing wall 5 in a forward/rearward direction.

The engine 3 is arranged in the engine room 2A, and a radiator 32 for the engine is arranged in the ventilation room 2B. A fan 33 is arranged behind the radiator 32. First ventilation ports 18 each constituted by a large number of holes are provided on an upper surface and left and right side surfaces of the ventilation room 2B, and a second ventilation port 19 constituted by a large number of holes is provided on a rear surface of the ventilation room 2B. By the operation of the fan 33, wind flows through the radiator 32 in a direction from the first ventilation ports 18 toward the second ventilation port 19 or in the opposite direction. It should be noted that the first ventilation port/ports 18 may be provided on only either the upper surface or left and right side surfaces of the ventilation room 2B.

In the present embodiment, the dividing wall 5 is bent in a substantially crank shape in a side view. However, the dividing wall 5 may be flat in a vertical direction. Specifically, the dividing wall 5 includes: a lower portion 53 facing a rear surface of the engine 3 and extending in the vertical direction; an intermediate portion 52 extending forward from an upper end portion of the lower portion 53 and covering a rear portion of the engine 3 from above; and an upper portion 51 extending upward from a tip end of the intermediate portion 52. To be specific, at a lower side of the machine room 2, the engine room 2A projects toward the ventilation room 2B, and at an upper side of the machine room 2, the ventilation room 2B projects toward the engine room 2A.

In the engine room 2A, an exhaust gas treatment device 4 is arranged above the engine 3. The exhaust gas treatment device 4 treats an exhaust gas of the engine 3 and is supported by a frame, not shown. Further, a tail pipe 15 through which the exhaust gas treated by the exhaust gas treatment device 4 is discharged to an outside is provided at a rear portion of an upper surface of the engine room 2A (i.e., at a substantially middle portion of the machine room 2).

The exhaust gas treatment device 4 includes a pretreatment unit 41 and an SCR unit 42 which are arranged parallel to each other. To be specific, the pretreatment unit 41 and the SCR unit 42 extend in the forward/rearward direction at positions adjacent to each other and are lined up in a horizontal direction. For example, each of the pretreatment unit 41 and the SCR unit 42 is cylindrical.

The upper portion 51 of the dividing wall 5 faces a rear surface of the pretreatment unit 41 and a rear surface of the SCR unit 42. Further, the upper portion 51 is inclined so as to get close to the pretreatment unit 41 and the SCR unit 42 as it extends downward.

The pretreatment unit 41 accommodates a DOC. The DOC converts nitrogen monoxide (NO) of the exhaust gas into nitrogen dioxide ($NO_2$). The pretreatment unit 41 may include a DPF provided downstream of the DOC. The pretreatment unit 41 includes: an inlet 41a located far from the dividing wall 5; and an outlet 41b located close to the dividing wall 5. In the present embodiment, the inlet 41a is formed on a front end surface of the pretreatment unit 41, and the outlet 41b is formed on a right side surface of the pretreatment unit 41. The inlet 41a is connected to the engine 3 by an introduction tube 31.

The SCR unit 42 causes below-described urea water to react with the exhaust gas. The SCR unit 42 includes: an inlet 42a located far from the dividing wall 5; and an outlet 42b located close to the dividing wall 5. In the present embodiment, the inlet 42a is formed on a front end surface of the SCR unit 42, and the outlet 42b is formed on an upper side surface of the SCR unit 42. The inlet 42a is connected to the outlet 41b of the pretreatment unit 41 by a connecting pipe 43. The outlet 42b extends upward to get into the tail pipe 15.

The connecting pipe 43 includes: a linear mix portion 43a located between the pretreatment unit 41 and the SCR unit and extending in the forward/rearward direction; a first bent portion 43b connecting the mix portion 43a and the outlet 41b of the pretreatment unit 41; and a second bent portion 43c connecting the mix portion 43a and the inlet 42a of the SCR unit 42. The mix portion 43a is a portion where the below-described urea water and the exhaust gas are mixed with each other. In the present embodiment, the first bent portion 43b is bent at right angle to the mix portion 43a, and the second bent portion 43c is smoothly bent at 180 degrees from the mix portion 43a.

However, the shape of the connecting pipe 43 is not limited to the shape shown in FIG. 3. For example, in a case where the outlet 41b of the pretreatment unit 41 is formed on a rear end surface of the pretreatment unit 41, the first bent portion 41b may be smoothly bent at 180 degrees from the mix portion 43a.

A urea water injection device 44 (dozing module, for example) is attached to the first bent portion 43b of the connecting pipe 43 so as to be located on an extended line of the mix portion 43a. The urea water injection device 44 injects the urea water into the exhaust gas in a direction along a center line of the mix portion 43a extending in the vehicle width direction.

A urea water tank 71 storing the urea water is arranged outside the engine room 2A. In the present embodiment, the urea water tank 71 is arranged beside the vehicle body 11. Specifically, a supporting portion 11a is provided on a side surface of the vehicle body 11 so as to be located behind the rear wheel 14, and the urea water tank 71 is placed on the supporting portion 11a. However, the urea water tank 71 may be arranged at a rear side or lower side of the vehicle body 11. Or, the urea water tank 71 may be arranged in the ventilation room 2B.

The urea water is guided from the urea water tank 71 to the urea water injection device 44 through a urea water pipe 6. A urea water pump 72 is provided on a portion of the urea water pipe 6. In the present embodiment, the urea water pump 72 is attached to the lower portion of the dividing wall 5. However, the urea water pump 72 may be attached to, for example, the supporting portion 11a so as to be located adjacent to the urea water tank 71.

Figure 4:
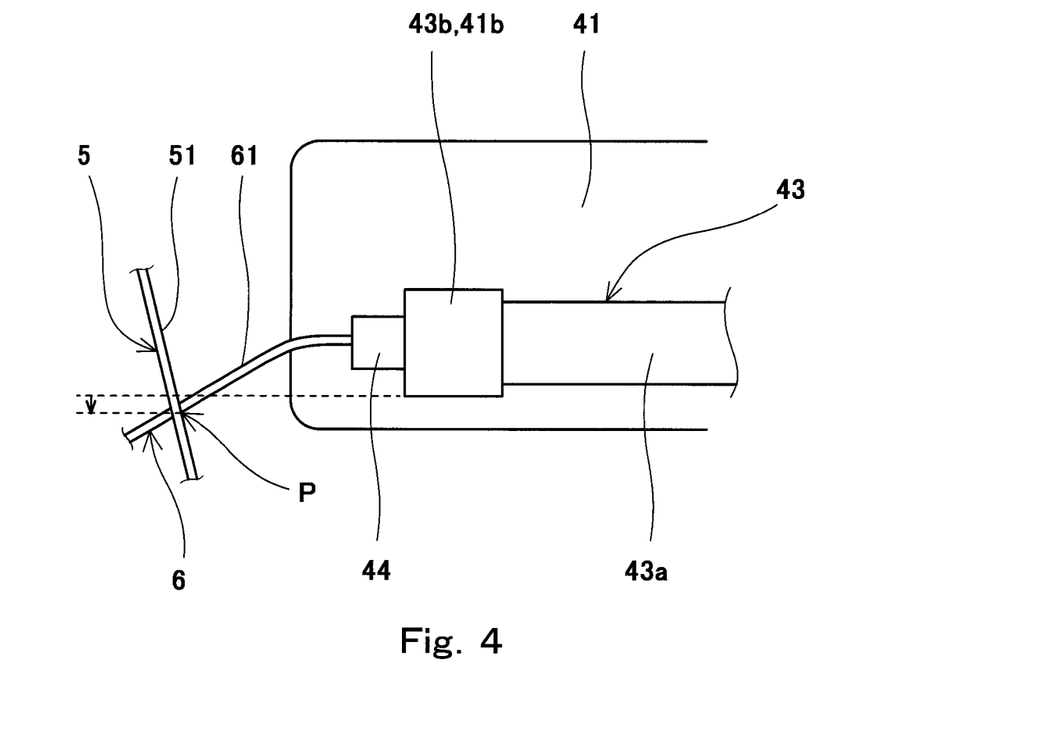
FIG. 4 is an enlarged view of an engine room passing portion of a urea water pipe.

The urea water pipe 6 penetrates the upper portion 51 of the dividing wall 5. In the present embodiment, as shown in FIG. 4, a position P where the urea water pipe 6 penetrates the upper portion 51 of the dividing wall 5 is located lower than the urea water injection device 44. Then, an engine room passing portion 61 of the urea water pipe 6 extends from the dividing wall 5 to the urea water injection device 44 and is inclined obliquely downward from the urea water injection device 44 toward the dividing wall 5. More specifically, as shown by an arrow between two broken lines in FIG. 4, the position P where the urea water pipe 6 penetrates the upper portion 51 of the dividing wall 5 is located lower than a lower end of the connecting pipe 43.

As explained above, in the industrial vehicle 1 of the present embodiment, since the exhaust gas treatment device 4 is arranged above the engine 3, the length of the engine room 2A in the forward/rearward direction can be reduced. Further, since the mix portion 43a of the connecting pipe 43 extends in the forward/rearward direction, and the urea water injection device 44 is attached to the first bent portion 43b located close to the dividing wall, the urea water injection device 44 can be arranged close to the dividing wall 5. With this, the length of the engine room passing portion 61 of the urea water pipe 6 can be reduced, the engine room passing portion 61 being exposed to a high-temperature environment in the engine room 2A, and the heat influence on the urea water can be reduced.

Further, in the present embodiment, the engine room passing portion 61 of the urea water pipe 6 is inclined obliquely downward toward the rear side. Therefore, when the supply of the urea water to the urea water injection device 44 is stopped, the urea water is easily discharged by its own weight from the engine room passing portion 61 to an upstream side in the ventilation room 2B. On this account, it never occurs that the urea water remains in the engine room passing portion 61 during the supply stop of the urea water to be influenced by heat. Thus, it never occurs that when the supply of the urea water is restarted, the urea water newly sent to the engine room passing portion 61 is mixed with the urea water influenced by the heat.

Further, in the present embodiment, since the position P where the urea water pipe 6 penetrates the dividing wall 5 is located lower than the lower end of the connecting pipe 43, an angle of the obliquely downward inclination of the engine room passing portion 61 of the urea water pipe 6 can be increased. With this, when the supply of the urea water to the urea water injection device 44 is stopped, the urea water can be quickly discharged from the engine room passing portion 61.

Further, in the present embodiment, the upper portion 51 of the dividing wall 5 is inclined so as to fall rearward. Therefore, the length of the engine room passing portion 61 having the obliquely downward inclination can be further reduced as compared to a case where the upper portion 51 is provided parallel to the vertical direction.

Modified Example

The present invention is not limited to the above-described embodiments, and various modifications may be made within the scope of the present invention.

One example may be that the engine room passing portion 61 of the urea water pipe 6 extends in the horizontal direction, the urea water pipe 6 penetrates the upper portion 51 of the dividing wall 5 at the same height position as the urea water injection device 44. In this case, the upper portion 51 of the dividing wall 5 may be flat in the vertical direction.

Further, a route of the urea water pipe 6 in the ventilation room 2B may be determined arbitrarily.

Further, depending on the type of the industrial vehicle, the ventilation room 2B may be arranged at the front side, and the engine room 2A may be arranged at the rear side, or the machine room 2 may be arranged in front of the driver's cab 15.

REFERENCE SIGNS LIST 1 industrial vehicle
2 machine room 2A engine room
2B ventilation room
3 engine
4 exhaust gas treatment device
41 pretreatment unit
41b outlet
42 SCR unit
42a inlet
43 connecting pipe
43a mix portion
43b first bent portion
43c second bent portion
44 urea water injection device
5 dividing wall
51 upper portion
6 urea water pipe
71 urea water tank

The invention claimed is:

1. An industrial vehicle comprising:
a machine room including an engine room and a ventilation room which are separated by a dividing wall in a forward/rearward direction;
an engine arranged in the engine room;
an exhaust gas treatment device arranged in the engine room so as to be located above the engine, the exhaust gas treatment device including
 a pretreatment unit accommodating a diesel oxidation catalyst and extending in the forward/rearward direction,
 a selective catalytic reduction unit located adjacent to the pretreatment unit and extending in the forward/rearward direction,
 a connecting pipe including a mix portion, a first bent portion, and a second bent portion, the mix portion being located between the pretreatment unit and the selective catalytic reduction unit and extending in the forward/rearward direction, the first bent portion connecting the mix portion and an outlet of the pretreatment unit, the outlet being located close to the dividing wall, the second bent portion connecting the mix portion and an inlet of the selective catalytic reduction unit, the inlet being located far from the dividing wall, and
 a urea water injection device attached to the first bent portion of the connecting pipe so as to be located on an extended line of the mix portion and configured to inject urea water into an exhaust gas;
a urea water tank arranged outside the engine room and storing the urea water; and
a urea water pipe configured to guide the urea water from the urea water tank to the urea water injection device and penetrating the dividing wall.

2. The industrial vehicle according to claim 1, wherein:
a position where the urea water pipe penetrates the dividing wall is located lower than the urea water injection device; and
the urea water pipe is inclined obliquely downward from the urea water injection device toward the dividing wall.

3. The industrial vehicle according to claim 2, wherein the position where the urea water pipe penetrates the dividing wall is located lower than a lower end of the connecting pipe.

4. The industrial vehicle according to claim 2, wherein:
the dividing wall includes an upper portion facing the pretreatment unit and the selective catalytic reduction unit, the upper portion being inclined so as to get close to the pretreatment unit and the selective catalytic reduction unit as the upper portion extends downward; and
the urea water pipe penetrates the upper portion of the dividing wall.

* * * * *